United States Patent
Bowman et al.

(10) Patent No.: US 10,120,890 B2
(45) Date of Patent: Nov. 6, 2018

(54) FORMULA-ENCODED TIME STAMPS FOR TIME SERIES DATA

(71) Applicant: SAP SE, Walldorf (DE)

(72) Inventors: Ivan T. Bowman, Hammonds Plains (CA); Daniel James Farrar, Kitchener (CA); Daniil Golod, Kitchener (CA)

(73) Assignee: SAP SE, Walldorf (DE)

( * ) Notice: Subject to any disclaimer, the term of this patent is extended or adjusted under 35 U.S.C. 154(b) by 600 days.

(21) Appl. No.: 14/748,106

(22) Filed: Jun. 23, 2015

(65) Prior Publication Data

US 2016/0378814 A1    Dec. 29, 2016

(51) Int. Cl.
*G06F 17/30* (2006.01)

(52) U.S. Cl.
CPC .............. *G06F 17/30353* (2013.01)

(58) Field of Classification Search
CPC ......... G06F 17/30353; G06F 17/30339; G06F 17/30351
See application file for complete search history.

(56) References Cited

U.S. PATENT DOCUMENTS

| | | | |
|---|---|---|---|
| 5,883,924 A * | 3/1999 | Siu ................ | H04N 17/004 348/464 |
| 2014/0149444 A1 * | 5/2014 | Pompey ............ | G06F 17/30427 707/760 |

* cited by examiner

*Primary Examiner* — Loc Tran

(74) *Attorney, Agent, or Firm* — Mintz Levin Cohn Ferris Glovsky and Popeo, P.C.

(57) ABSTRACT

Time stamps for time series data can be efficiently compressed by grouping rows in a database table such that time stamp values of the rows in the group are ordered and characterizable by an increment and an offset, which can be stored for the set of rows respectively in an increment column and an offset column such that the time stamp values of the set of rows are represented by a single slope and offset. A run-length compression can be applied to the increment column and offset column for the table.

17 Claims, 11 Drawing Sheets

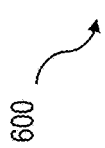

```
entity Weather {
  station_id   String(3) not null;
  ts_utc       UTCTimestamp not null;  -- UTC time at start of period
  ts_local     UTCTimestamp not null;  -- local time at start of period
  temp         Decimal(3,1) not null;  -- mean temp
  wind_speed   Decimal(2) null;        -- wind speed (Km/h)
  ts_utc_month UTCTimestamp not null;  -- period rounded to months
    GENERATED ALWAYS AS SERIES_ROUND(ts_utc,'INTERVAL 1 MONTH');
} SERIES (
  SERIES KEY(station_id)
  EQUIDISTANT PIECEWISE
  PERIOD FOR SERIES (ts_utc)
  ALTERNATE PERIOD FOR SERIES(ts_local)
```

FIG. 6

```
CREATE COLUMN TABLE "Weather._T"(
  "station_id" VARCHAR(3) NOT NULL,
  "ts_utc.0" TIMESTAMP NULL,
  "ts_utc.m" BIGINT NOT NULL DEFAULT 0,
  "ts_utc.x" INTEGER NOT NULL DEFAULT 0,
  "ts_utc.b" TIMESTAMP NOT NULL DEFAULT '0001-01-01',
  "ts_utc.j" BIGINT NOT NULL DEFAULT 0,
  "ts_local.0" TIMESTAMP NULL,
  "ts_local.a" BIGINT NOT NULL DEFAULT 0,
  "temp" DECIMAL(3,1) NOT NULL,
  "wind_speed" DECIMAL(2) NULL,
  "ts_utc_month" TIMESTAMP NULL GENERATED ALWAYS AS
    SERIES_ROUND( COALESCE("ts_utc.0",
      CAST(ADD_SECONDS("ts_utc.b",
        ("ts_utc.m"*"ts_utc.x"+"ts_utc.j")*0.000000100)
      AS TIMESTAMP)),'INTERVAL 1 MONTH'),
  "ts_local_month" TIMESTAMP NULL GENERATED ALWAYS AS
    SERIES_ROUND( COALESCE("ts_local.0",
      CAST(ADD_SECONDS("ts_utc.b",
        ("ts_utc.m"*"ts_utc.x"+"ts_utc.j"
        +"ts_local.a")*0.000000100)
      AS TIMESTAMP)),'INTERVAL 1 MONTH'),
  "FLAGS_.0" INTEGER NOT NULL DEFAULT 0
)
PARTITION BY HASH("station_id") PARTITIONS 2
SERIES(
  SERIES KEY("station_id")
  EQUIDISTANT INCREMENT BY 1
  PERIOD FOR SERIES("ts_utc.x")
)
```

```
CREATE VIEW "Weather" AS
SELECT T."station_id",
    COALESCE(T."ts_utc.0",
    CAST(ADD_SECONDS("ts_utc.b",
        ("ts_utc.m"*"ts_utc.x"+"ts_utc.j")*0.000000100)
        AS TIMESTAMP)) AS "ts_utc",
    COALESCE(T."ts_local.0",
    CAST(ADD_SECONDS("ts_utc.b",
        ("ts_utc.m"*"ts_utc.x"+"ts_utc.j"
        +"ts_local.a")*0.000000100)
        AS TIMESTAMP)) AS "ts_local",
    T."temp",
    T."wind_speed",
    T."ts_utc_month",
    T."ts_local_month"
FROM "Weather._T" AS T
```

```
SELECT *
FROM SeriesTable ST
WHERE ST.ts BETWEEN t1 AND t2
    ↑
SELECT *
FROM SeriesTable ST
WHERE ST.t_hour BETWEEN SERIES_ROUND(t1,'INTERVAL 1
HOUR',ROUND_DOWN)          AND SERIES_ROUND(t2,'INTERVAL 1
HOUR',ROUND_UP)
          AND ST.ts BETWEEN t1 AND t2
```

1000

*FIG. 10*

FORMULA-ENCODED TIME STAMPS FOR TIME SERIES DATA

TECHNICAL FIELD

The subject matter described herein relates to storage of time stamped data in a database.

BACKGROUND

When time-series data are stored in a database management system (DMS), a non-limiting example of which is a high speed in-memory database system (IMDBS) such as the HANA architecture available from SAP (Walldorf, Germany), the majority of the storage required may be used for storing the timestamps associated with measurements. Because a typical time stamp value can require 4 to 6 bytes of storage space, very long series of time stamped data having a large number of measurements can require substantial storage space. For example, a utility provider (energy, water, telecommunications, etc.) operating "smart" meters for a million customers generates nearly 100 million data records in a day if each meter is sampled every 15 minutes. While various compression methods can be employed to reduce the storage requirements for data in the measurement columns, such approaches generally are not as useful for time stamp data, at least because the individual data values retained in such columns can be unique or nearly unique.

As a consequence, the data size can be extremely high for working with time-series data sets. For an IMDBS, large data sizes can require extremely high usage of main system memory and can be limiting or even prohibitive for certain in-memory operations.

SUMMARY

In one aspect, a method includes physically sorting rows in a database table to group a set of the rows having time stamp values in a time stamp column that are encodable by a linear formula and to organize the rows so that the time stamp values of the rows in the group are ordered and characterizable by an increment and an offset. The method further includes computing the increment and offset for the set of rows, storing the increment and offset for the set of rows respectively in an increment column and an offset column such that the time stamp values of the set of rows are represented by a single slope and offset, and applying a run-length compression to the increment column and offset column for the table.

In some variations one or more of the following features can optionally be included in any feasible combination. A linear run-length compression can be applied to an element number column that stores element number values. When the element number is multiplied by the increment and added to the offset in the linear formula, the corresponding time stamp value can be computed. Values of the time stamps can be changed for the set of rows in an original time stamp column to null after storing the increment and offset for the set of rows. An additional column can be populated with rounded time stamps in which, for each row of the set of rows, the rounded time stamp is equal to the time stamp for that row rounded according to a rounding parameter. The additional column can be used to improve performance of a time stamp range predicate operation on the table and/or to improve performance of an OLAP query on the table. The method can optionally further include computing a jitter value for one or more rows of the set of rows to represent a deviation from the linear formula and storing the jitter value for the one or more rows in a jitter column such that the time stamp values of the set of rows are represented by the single slope and offset with the time stamp values for the one or more rows further including addition of the jitter value.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 shows an example of a logical view of an equidistant-piecewise series table.

FIG. 7 shows an example of a physical/logical representation of a series table using formula-encoded time stamps consistent with implementations of the current subject matter;

FIG. 10 shows an example of inferring efficient sargable predicates consistent with implementations of the current subject matter.

When practical, similar reference numbers denote similar structures, features, or elements.

DETAILED DESCRIPTION

Figure 1:
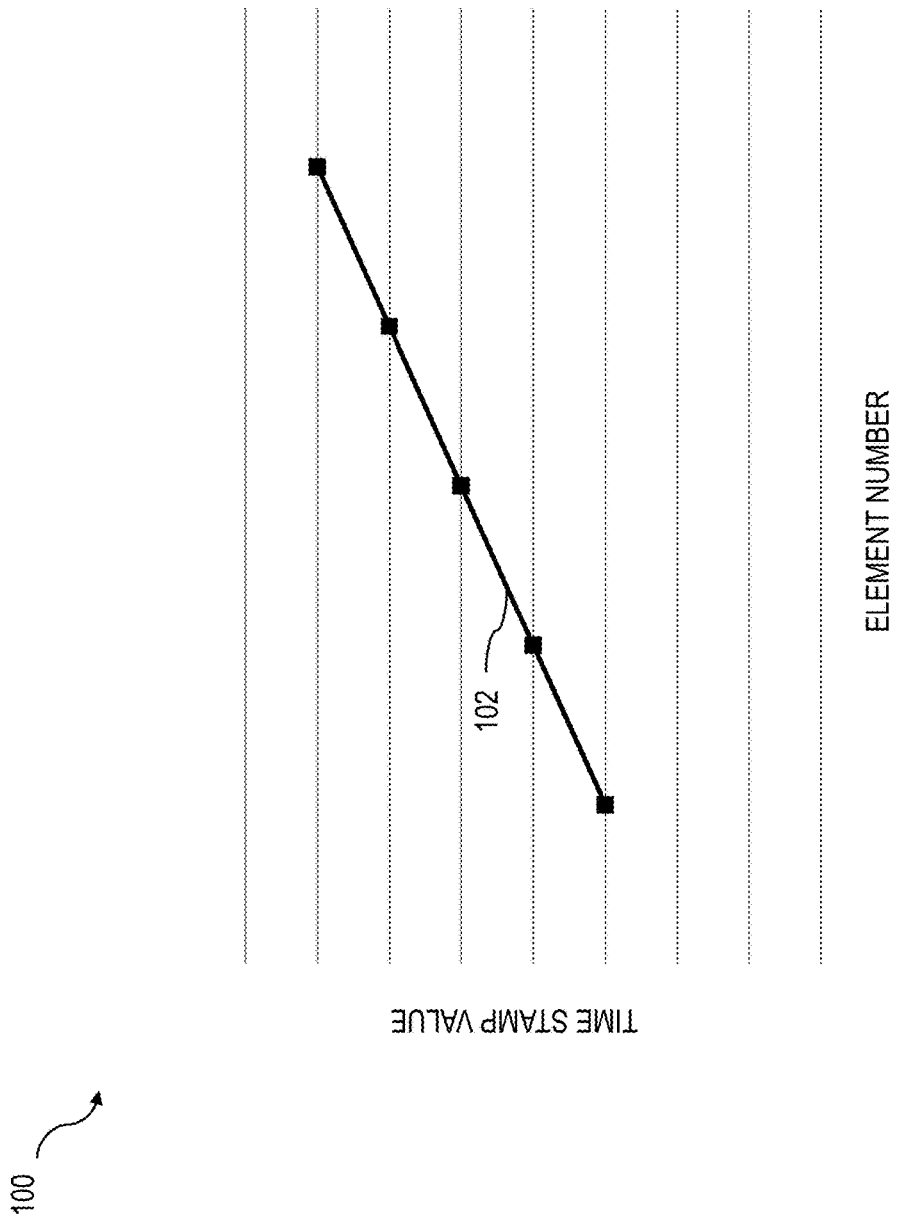
FIG. 1 shows a chart illustrating time stamp data having a constant offset and increment (slope)

One approach to compression of timestamp data values relies on assumptions that each timestamp value has an equidistant temporal increment (referred to hereinafter as an increment) from the preceding and succeeding time stamp value in a series and that the time stamps have a constant and repeating offset. As used herein, the term increment refers to an amount of time between time stamp values (e.g. a time interval from one time stamp value to a next time stamp value), and the offset refers to an amount of time by which a set of regularly spaced (e.g. by an increment amount) time stamps are displaced from an even multiple of the increment. In other words, if measurements are taken every fifteen minutes at three minutes past the hour, eighteen minutes past the hour, thirty-three minutes past the hour and fourth-eight minutes past the hour, the increment is fifteen minutes and the offset is three minutes. A series of time stamp values with a constant increment and offset can be compressed by storing for each value the slope (a multiplier equivalent to the increment) and the offset. Given the slope and offset values, and where there is a single slope and offset for all rows in a group of rows, the time stamp values for that group can be compressed into the single slope and offset values.

Implementations of the current subject matter are capable of handling data for which the timestamps have an at least semi-linear structure that does not perfectly match the requirements of an equidistant series and can also support use cases in which data are inserted into a table in an order that does not match a best physical ordering for optimizing compression.

Previously available approaches can provide good compression under certain constraints. For example, the data generally needed to be loaded in an appropriate order and the time stamp values were required to match known properties (offset and slope) throughout the entire table. As noted above, implementations of the current subject matter can locally store at least an increment and an offset for each row (and optionally a "jitter") and thereby represent the time stamp for that row as a computed quantity. Consistent with implementations of the current subject matter, a time stamp can be represented as a formula:

$$t_s = m \times x + b + j \quad (1)$$

where $t_s$ is the timestamp associated with the measurement, m is a local slope (e.g. a multiplier representative of the increment between time stamp values in a series, x is an integer indicative of a sequential position of the time stamp in the series, b is an offset, and j (an optional feature) represents jitter (defined below). When data are loaded into the database, the time stamp values can be stored uncompressed. A periodic reorganize process, which is described in more detail below, can be implemented to apply a piecewise-linear fitting of the timestamps, which includes identifying a local slope and offset for each linear segment. All of the rows within one linear segment have the same slope (m) and offset (b) after the reorganize process, and these rows are ordered such that the time stamp increases linearly from value to value according to the increment.

By representing time stamps in a manner consistent with implementations of the current subject matter (e.g. as described above), memory compression can be achieved using existing compression methods. For example, run-length encoding (RLE) can be used to compress columns respectively containing slope (increment) values and offsets such that one increment and offset entry per segment is used to represent a single constant value for each parameter. In some examples, linear run-length encoding (LRLE) can be used for "x" values (e.g. an integer indicating position of a given time stamp within the linear segment), which are also referred to as an element number (e.g. a numerical position within the time series). In LRLE, a run is defined by its start position, start value, and length. Within a run, the position of an included value can be calculated by adding the run's start position to the value's position inside the run, which is given as the difference between the value itself and the run's start value. Further details of linear run-length encoding are described in co-owned and co-pending U.S. patent application Ser. No. 14/326,397 (filed on Jul. 8, 2014), which is incorporated herein by reference. Other relevant compression approaches can be used for the values in one or more measurement columns as discussed below.

FIG. 1, FIG. 2A, FIG. 2B, FIG. 3, and FIG. 4 show charts 100, 200, 250, 300, 400 illustrating some features of time series data sets that can be efficiently compressed using one or more approaches consistent with implementations of the current subject matter. In each chart, time is shown on the vertical axis and the horizontal axis indicates position of the time stamp in a time series (e.g. the element number or "x" in equation 1). The chart 100 of FIG. 1 shows an example of equidistant time series data without offsets. As shown, a run 102 of time stamped data can be represented by a single slope (m in equation 1) as all of the time stamps in the series are multiples of a single increment. The offset (b in equation 1) is zero, or, alternatively, the same for all values in this example.

Figure 2:
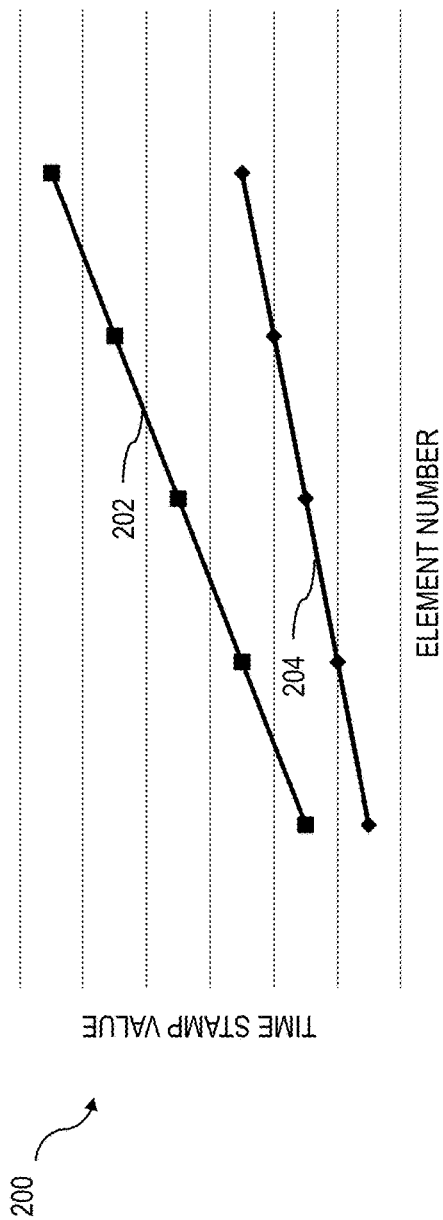
FIG. 2A and FIG. 2B show charts illustrating time stamp data having a different increments (slopes) for different groups of rows.

In the charts 200, 250 of FIG. 2A and FIG. 2B, different segments of time series data have different increments. In other words, the slope (m) of a first segment 202 can differ from that of a second segment 204 as shown in FIG. 2A. Consistent with implementations of the current subject matter, a single table can support multiple increments to permit compression of time stamp data in which different time series have different increments (e.g. as in FIG. 2A) or in which a single time series has sub-segments characterized by more than one increment (e.g. a different slope in a first segment 252 of a time series than in a second segment 254 of the time series. In general, it is not possible to know at table creation time all of the possible increment values. Implementations of the current subject matter can handle such a difficulty in that the increment for any given time series or sub-segment within a time series can be assigned without altering the table format.

Figure 3:
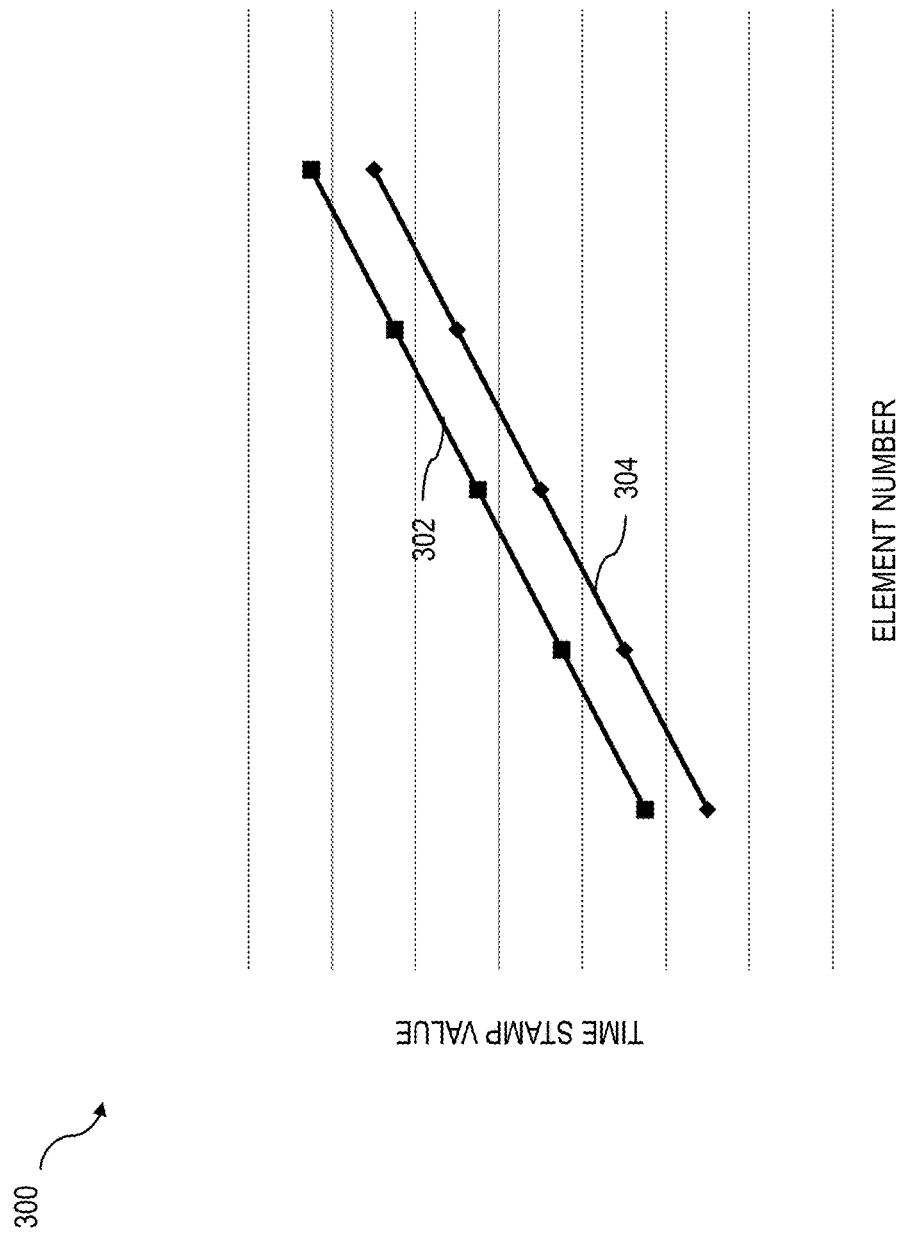
FIG. 3 shows a chart illustrating time stamp data having a different offsets for different groups of rows.

In some use cases, time stamps are not aligned on exact multiples of an increment value. For example, there may be a single offset for an entire table or a different offset per series or sub-segment of data. In general, the offset is not and need not be known at table creation time. FIG. 3 shows a chart 300 illustrating an example of this kind of time series data, in which one linear segment of time stamps 302 has a first offset and a second linear segment of time stamps 304 has a second offset. If there are relatively few different slopes and offsets, these will compress well when using standard RLE compression.

Figure 4:
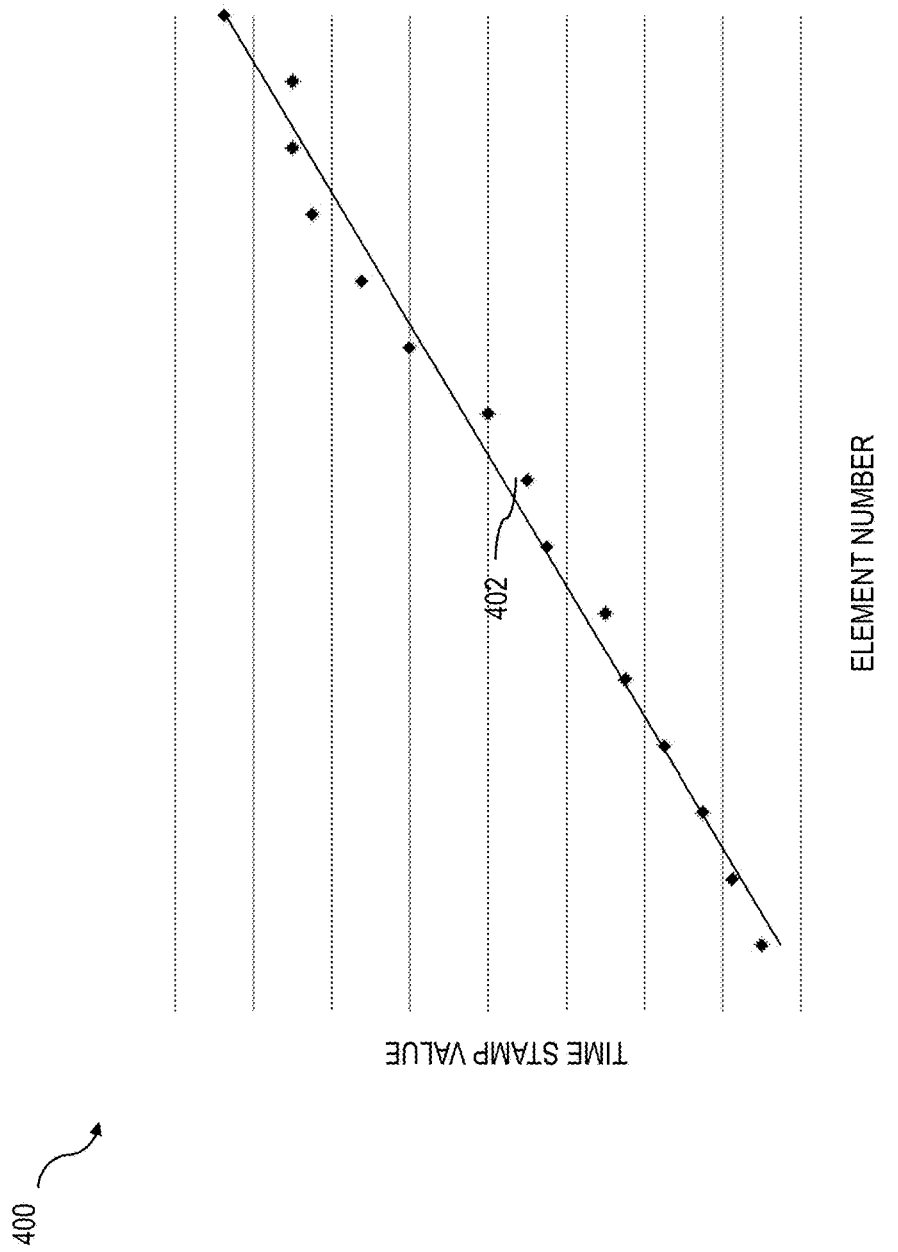
FIG. 4 shows a chart illustrating time stamp data having jitter.

FIG. 4 shows a chart 400 illustrating an example of jitter, which can optionally be represented in equation 1 as the term j, which accounts for possible local variation in the time stamps. For example, sensors can record at a nominal rate but with some slight variation, thereby resulting in an at least slightly different offset from time stamp value to time stamp value. In the chart 400 of FIG. 4, individual time stamp values can vary by a small amount relative to a line 402 based on equation 1 with j equal to zero. Addition of the jitter term can allow the time stamp to be accurately computed. The jitter value reflects small variations from the exact line definition. In the case that there are relatively few distinct jitter values, these can be represented efficiently with n-bit compression.

It can be burdensome for an application to compute the slope, offset, and (optionally) jitter when loading data. To mitigate this burden, a periodic reorganize process can be applied such that un-encoded time stamp values are received as input and then periodically reorganized and encoded using equation 1. A database management system can automatically initiate such a reorganize process, for example on some preset time interval, when a threshold number of new records have been added to a table, etc. After a set of rows has been processed using the reorganize process, the original timestamp is no longer stored as a single value in a column. Instead, it is computable as an expression of three or optionally four more readily compressible columns (m, x, b, j).

Figure 5:
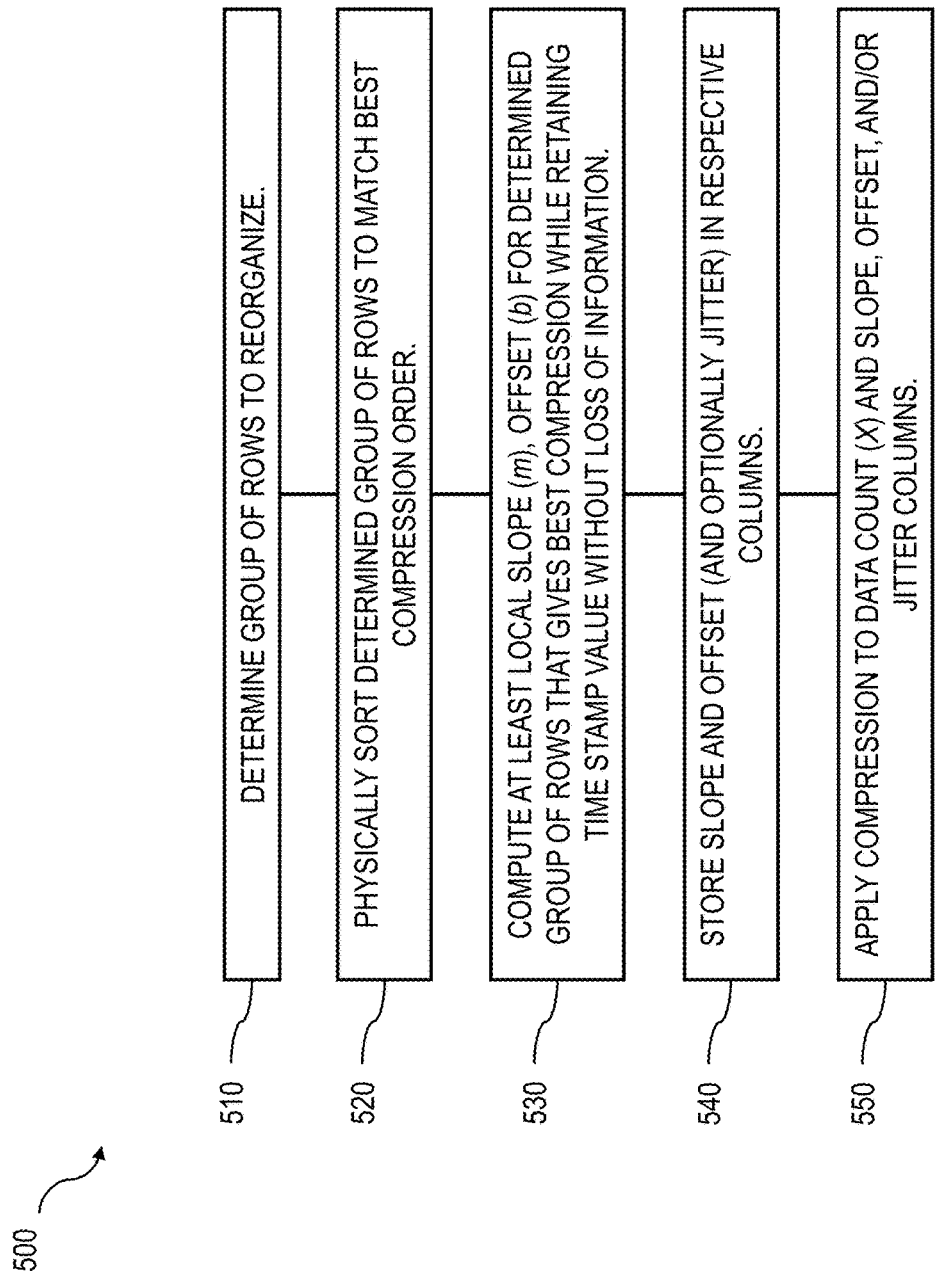
FIG. 5 shows a process flow diagram illustrating aspects of a method having one or more features consistent with implementations of the current subject matter.

The process flow chart 500 of FIG. 5 illustrates features that can be included in a method consistent with the current subject matter and including a periodic reorganize process. In general, the reorganize process includes reordering data in a way that improves compression of a row identifier (rowid) column and that also matches the physical order of the data to an order that is both optimized for compression and most likely to be useful for query processing. The process can include determining a group of rows to reorganize at 510; physically sorting the determined group of rows to match a best compression order (series key, timestamp) at 520; computing for the determined group of rows a local slope (m), offset (b) and, optionally, jitter (j) that gives the best compression while retaining the time stamp value without loss of information at 530; storing the slope and offset (and optionally the jitter) in respective columns at 540; and applying a compression to an element number (x) and one or more of the slope, offset, and jitter columns at 550.

The determining of the group of rows to reorganize can be performed by identifying time stamps that differ by a consistent interval (e.g. the increment) and that have an equal offset based on the identified increment. The physical sorting can put these rows into an order that allows a monotonic series of x values compressible by LRLE with a single slope and offset for the group of rows. The reorganize process can include creation of an x column as well as an increment column (m), an offset (b) column, and optionally a jitter (j) column. The computed increment, offset, and jitter values for each row are stored in the respective columns.

Consistent with some implementations of the current subject matter, a reorganize process can be transparent to the user such that a user can create a series table and not need to be aware of the reorganization and representation of the timestamp as encoded. In other implementations of the current subject matter, a separate SQL view can match a table that the user creates and a physical base table can record formula encoded timestamp columns. Creation of the SQL view and base table can be managed by a core data services layer (or similar functionality) of the DMS, which can support creation of formula encoded times stamps. Users of such an implementation can be able to work with the SQL view as if it were a base table for operations including SELECT, INSERT, UPDATE, and DELETE statements as well as IMPORT and EXPORT. In some specific cases, the user can be required to work with the underlying base table instead of the SQL view. For example, when working with the base table, the column structure may not match what the user selected and the user must then be aware of the logical/physical representation. Base table operations can include building column views (for example, online analytical processing views), altering the table to adjust partitioning, etc.

An example of the current subject matter can include use of formula encoding of time stamps for weather monitoring data as discussed below. In this example, data are recorded at a single weather station. A "Weather" entity can be defined per the logical view 600 shown in FIG. 6. The illustrated weather entity illustrates classes of columns that can appear in a formula encoded time stamp series tables. Series keys (e.g. station_id for each of one or more weather stations) can be columns that uniquely identify a single series within the table. In this example, a single column station_id identifies a weather station where the data was recorded. A period column (e.g. $t_{s\_utc}$) can be required to have a type that maps to TIMESTAMP, SECONDDATE, or DATE. In certain implementations of the current subject matter, for EQUIDISTANT PIECEWISE series tables, only a single period column is permitted.

Alternate period column(s) (e.g. $t_{s\_local}$) can be used in some examples to record the period column offset by a time zone or a daylight savings time adjustment. The alternate period columns can record time stamps that are expected to have an offset that differs from the period column by an offset that is constant for blocks of rows, and can also therefore be readily compressed. Value columns (e.g. temp, wind_speed) can record values for one or more measurements of interest for the series. Block index columns (e.g. $t_{s\_utc\_month}$) can store the value of a period column or alternate period column rounded to a coarser interval. For example, a rounding parameter can indicate how rounding of the time stamp values should occur. The rounding parameter can optionally be provided as a user input. These columns can be used automatically by a server to improve the performance of range predicates on the original column, and they can also assist in improving performance for OLAP queries. A range predicate is a logical expression that resolves to true, false dependent on whether or not a value is within a stated range.

Figure 8:
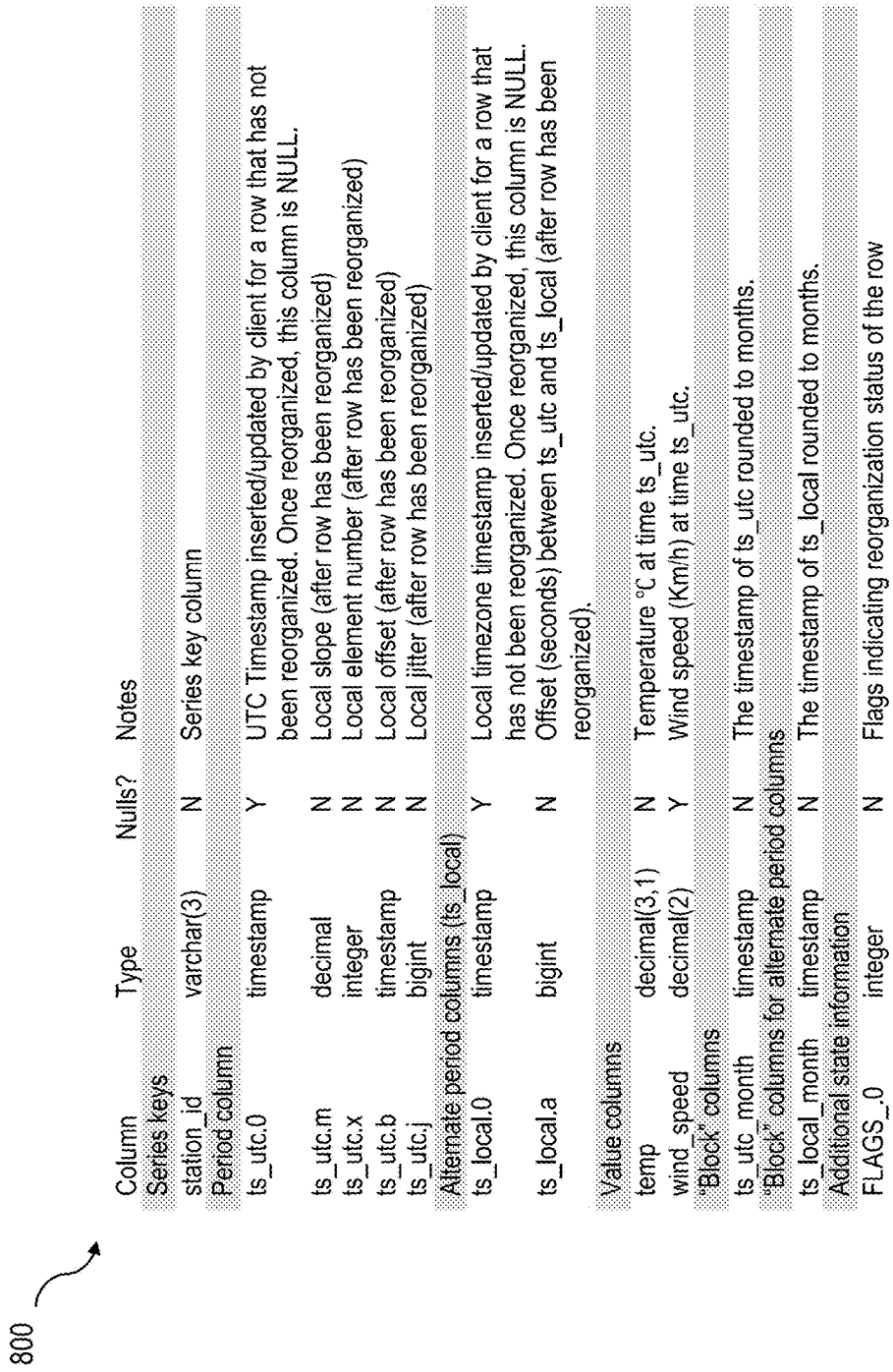
FIG. 8 shows a table illustrating details about columns in a weather-related example consistent with implementations of the current subject matter.
Figure 9:
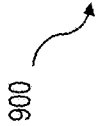
FIG. 9 shows an example of a physical/logical representation of a series table using a formula-encoded time stamp approach consistent with implementations of the current subject matter.

When programming functionality containing the Weather entity is activated, the activation process generates a corresponding database table (Weather._T) and a SQL view (Weather) as shown in the logical definition 700 provided in FIG. 7. In an implementation using the SAP HANA in-memory database, the programming functionality can be a core data services document. FIG. 8 shows a table 800 illustrating parameters of columns in the weather example described above. The Weather._T database table does not match the structure of the logical view of the Weather entity (e.g. as defined in the core data services layer), but rather encodes the period and alternate period columns using formulas, and it also has additional columns that don't match the entity definition. The Weather SQL view does correspond to the Weather entity definition as shown in the representation 900 of FIG. 9.

When data are first inserted, the ts_utc is stored unmodified in a column (ts_utc.0 in this example). After a later reorganize step, the ts_utc.0 column is set to NULL and the slope, offset, and jitter columns are initialized. The view column ts_utc can then be defined using a COALESCE to retrieve the unmodified value (ts_utc.0) for rows that have not been reorganized or the computed value ($t_{s\_utc.m}*t_{s\_utc.x}+t_{s\_utc.b}+t_{s\_utc.j}$) for rows that have already been reorganized, for example as follows:

$$t_{s\_utc} = \text{COALESCE}(t_{s\_utc.0}, t_{s\_utc.m}*t_{s\_utc.x}+t_{s\_utc.b}+t_{s\_utc.j}) \quad (2)$$

Using a physical/logical representation consistent with implementations of the current subject matter can provide advantages in allowing data to be loaded by the client in any order. Timestamp values are loaded into the ts_utc column, and the periodic "reorganize" process finds rows that have not previously been organized and applies the process summarized above in reference to FIG. 5 such that rows are reordered by a column such as a series key columns, a period column, or the like. The re-ordering is done by deleting and re-inserting the rows so that the rowid order matches this order, thereby giving good rowid compression. Local values of m, x, b, and j are selected to give the correct timestamp value with good local compression. The ts_utc.0 column is to NULL and a flags_column is updated to indicate that the row has been re-organized.

A formula encoded time stamp representation need not include any significant changes to an attribute engine of a DMS. Instead, it can rely on separating the physical and logical representation of the table. The physical representation encodes the period timestamp as noted above in equation 1. The logical representation is a view that gives the rows as interpreted by the client. When rows are inserted by the client application (e.g. using an INSERT statement targeting the SQL view), the timestamp provided by the client is stored in a column $t_s.0$ named after the period column ($t_s$). These rows are not necessarily inserted in an order that would give good compression.

A reorganize process is used to reorder rows and improve the compression. In addition to re-ordering the rows, this reorganizes time stamp column $t_{s.0}$ (e.g. containing the original, non-encoded time stamp values) and sets the $t_{s.m}$, $t_{s.x}$, $t_{s.b}$, and $t_{s.j}$ columns so that the computed timestamp column is correct and good local compression is achieved.

If there are alternate period columns such as $t_1$ then these are encoded as an offset from the first period column. Two physical columns are used for each local time column: $t_{1.0}$ and $t_{1.a}$. On insert, the application's value for the local time column is placed in $t_{1.0}$. After reorganize, the $t_{1.0}$ column is set to NULL and $t_{1.a}$ is computed as the difference from the period column ($t_s$) to the alternate period column. Since this difference is expected to be locally constant it is expected to benefit from RLE compression. The SQL view computes the alternate period column $t_1$=COALESCE($t_{1.0}, t_s+t_{1.a}$) (note that the $t_s$ must be expanded using its formula).

Applications can delete rows through the SQL view using the DELETE statement. These deletes can leave gaps in the reorganized data. These gaps do not affect the formula encoding of timestamps, but they can lead to reduced compression.

Applications can update rows using an UPDATE statement targeting the SQL view. If the timestamp column is updated, the change is made to the base column $t_{s.0}$. Due to the COALESCE, the updated timestamp is returned when using the SQL view. The $t_{s.m}$, $t_{s.x}$, $t_{s.b}$, and $t_{s.j}$ columns remain with their previous values.

As an example, an application author expecting that most of the data will be using an increment of 30 seconds can declare a generated column $t\_hour$ GENERATED ALWAYS AS SERIES_ROUND ($t_s$, 'INTERVAL 1 HOUR'). Depending on the application, it can be advantageous to generate more than one such column for a timestamp at different timestamp resolutions. Because of the rounding, the $t\_hour$ column will have runs of about 120 rows with a constant value and will benefit from RLE compression.

If a user directly refers to the rounded columns in queries, then good performance will be given. If the user instead writes a range predicate on the formula-encoded SQL view column, the performance would be slower as the predicate is not sargable. Sargable is a contraction of "search-argumentable" and means a condition that can be used to efficiently restrict rows that need to be considered, for example using an index. A sargable query is one in which a DMS engine can take advantage of an index to speed up the execution of the query. To improve performance, implementations of the current subject matter can include rule-based query rewrites that recognize a particular form of generated column using SERIES_ROUND, such as for example using the logic 1000 of FIG. 10 in which a new predicate is inferred on the stored $t\_hour$ column. This predicate is on a base column that is sargable. The original predicate is retained as a post-predicate. In some examples, the $t_s$ column expression is evaluated only for those rows near the edges of the ranges. Edges in the interior of the range can be confirmed to pass using only the $t\_hour$ column.

An EQUIDISTANT PIECEWISE column has no a-priori restriction on the timestamps that are stored (similar to a NOT EQUIDISTANT column). However, the data are expected to be well approximated as piecewise linear with some jitter. When a series table is defined as EQUIDSTANT PIECEWISE, the PERIOD includes one column (instant).

One or more alternate time columns can be identified using a LOCAL TIME specification. These alternate time columns can be assumed to locally have a constant delta from the period timestamp column. Local time columns have the same data type as the period column. In some use cases, both the start and end timestamp can be stored for a row. For example, when measuring the power consumed during an interval, it can be necessary to know the length of the interval. The end of the interval can be stored as an alternate period column. If rows typically represent similar interval lengths this will give good compression.

Figure 11:
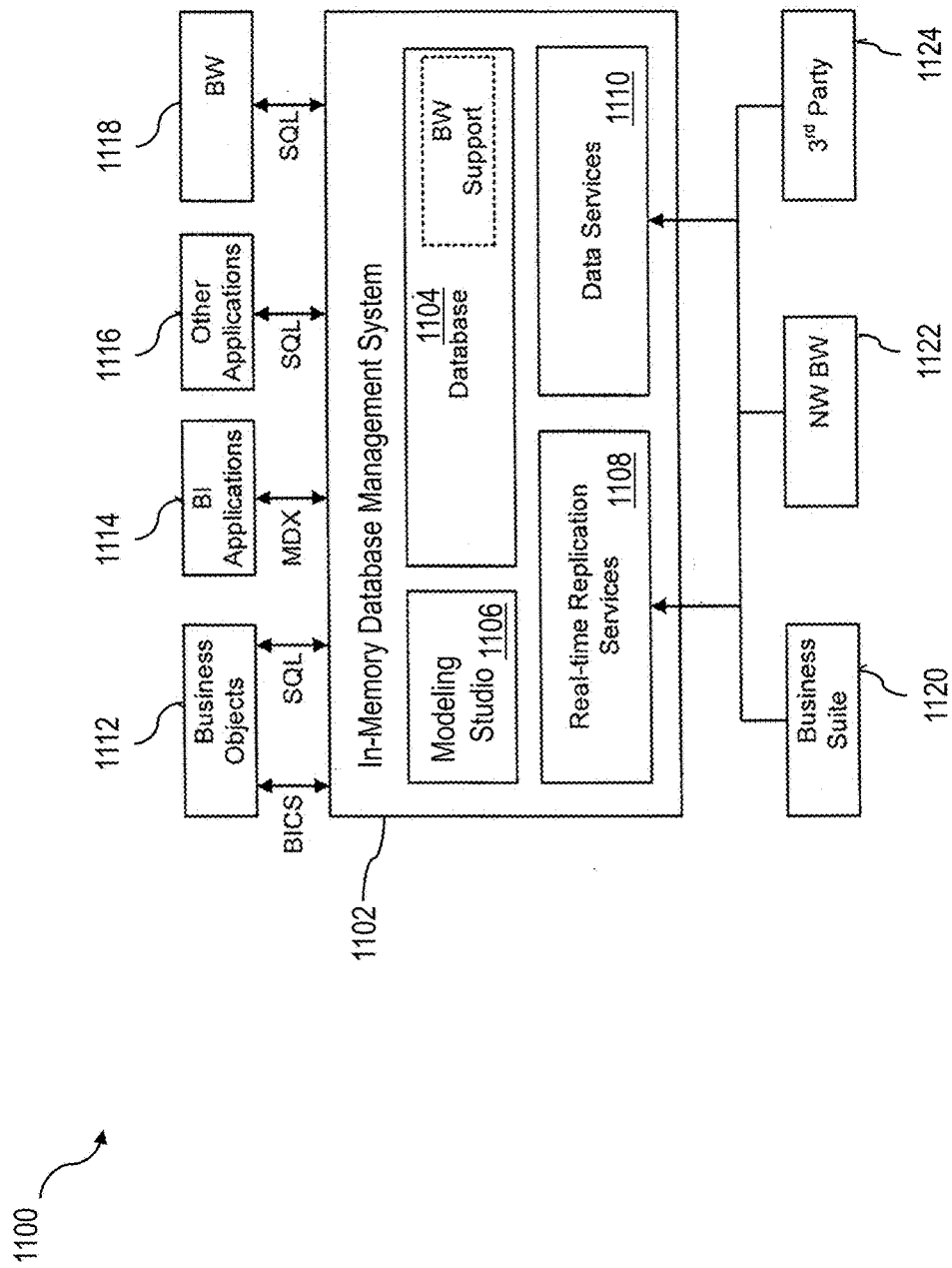
FIG. 11 shows a diagram illustrating aspects of a system showing features consistent with implementations of the current subject matter.

As noted above, some implementations of the current subject matter can include use of an in-memory database management system. FIG. 11 depicts a database architecture 1100 that includes an IMDMS 1102, which includes an in-memory database 1104 and a multi-engine query processing environment that offers different data abstractions supporting data of different degrees of structure, from well-structured relational data to irregularly structured data graphs to unstructured text data. This full spectrum of processing engines is based on a common table abstraction as the underlying physical data representation to allow for interoperability and the combination of data of different types. In exemplary implementations, the in-memory database system 1102 further includes real-time replication services 1108, and data services 1110, which can each interface with business suite design environments 1112, business warehouse design environments 1122, and third party design environments 1124.

The IMDMS 1102 supports the representation of application-specific business objects 1112 (such as OLAP cubes and domain-specific function libraries) and logic directly inside the database engine. This permits the exchange of application semantics with the underlying data management platform that can be exploited to increase the query expressiveness and to reduce the number of individual application-to-database roundtrips and to reduce the amount of data transferred between database 1104 and application 1114, 1116.

The IMDMS 1102 can efficiently communicate between the database and the application layer (i.e., proprietary applications 1114, third party applications 1116, and business warehouse applications 1118) by providing shared memory communication with proprietary application servers on the one hand and directly support the data types natively in the data management layer on the other hand. In addition, application server technology is integrated directly into the database system cluster infrastructure to enable an interweaved execution of application logic and database management functionality.

The database architecture 1100 also supports the efficient processing of both transactional and analytical workloads on the same physical database leveraging a highly-optimized column-oriented data representation. This advantage can be achieved through a sophisticated multistep record lifecycle management approach.

The IMDMS 1102 can include an appliance model with different components to yield a ready-to-go package for data analytics scenarios. In some implementations, the IMDMS 1102 provides native support for a business warehouse (BW) system 1112 to significantly speed up query and transformation scenarios but also allows to completely skip individual materialization steps. In order to provide this capability, the IMDMS 1102 has data loading and transformation tools, plus a modeling studio 1106 to create and maintain complex data flows in and out of the IMDMS 1102.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   physically sorting rows in a database table to group a set of the rows having time stamp values in a time stamp column that are encodable by a linear formula and to organize the rows so that the time stamp values of the rows in the group are ordered and characterizable by an increment and an offset;
   computing the increment and the offset for the set of rows;
   storing the increment and the offset for the set of rows respectively in an increment column and an offset column such that the time stamp values of the set of rows are represented by a single slope and the offset;
   changing values of the time stamps for the set of rows in an original time stamp column to null after storing the increment and the offset for the set of rows;
   applying a run-length compression to the increment column and the offset column for the table; and
   performing query processing on the database table, the query processing comprising use of the increment column and the offset column with the run-length compression applied.

2. A computer program product as in claim 1, wherein the operations further comprise: applying a linear run-length compression to an element number column, the element number column storing element number values that, when multiplied by the increment and added to the offset in the linear formula, compute a corresponding time stamp value.

3. A computer program product as in claim 1, wherein the operations further comprise: populating an additional column with rounded time stamps in which, for each row of the set of rows, the rounded time stamp is equal to the time stamp for that row rounded according to a rounding parameter.

4. A computer program product as in claim 3, wherein the operations further comprise: using the additional column to improve performance of a time stamp range predicate operation on the table.

5. A computer program product as in claim 3, wherein the operations further comprise: using the additional column to improve performance of an OLAP query on the table.

6. A computer program product as in claim 1, wherein the operations further comprise:
   computing a jitter value for one or more rows of the set of rows to represent a deviation from the linear formula;
   storing the jitter value for the one or more rows in a jitter column such that the time stamp values of the set of rows are represented by the single slope and the offset with the time stamp values for the one or more rows further including addition of the jitter value.

7. A system comprising:
   computer hardware configured to perform operations comprising:
   physically sorting rows in a database table to group a set of the rows having time stamp values in a time stamp column that are encodable by a linear formula and to organize the rows so that the time stamp values of the rows in the group are ordered and characterizable by an increment and an offset;
   computing the increment and offset for the set of rows;
   storing the increment and offset for the set of rows respectively in an increment column and an offset column such that the time stamp values of the set of rows are represented by a single slope and offset;
   change values of the time stamps for the set of row in an original time stamp column to null after storing the increment and the offset for the set of rows;
   applying a run-length compression to the increment column and the offset column for the table; and
   performing query processing on the database table, the query processing comprising use of the increment column and the offset column with the run-length compression applied.

8. A system as in claim 7, wherein the operations further comprise: applying a linear run-length compression to an element number column, the element number column storing element number values that, when multiplied by the increment and added to the offset in the linear formula, compute a corresponding time stamp value.

9. A system as in claim 7, wherein the operations further comprise: populating an additional column with rounded time stamps in which, for each row of the set of rows, the rounded time stamp is equal to the time stamp for that row rounded according to a rounding parameter.

10. A system as in claim 9, wherein the operations further comprise: using the additional column to improve performance of a time stamp range predicate operation on the table.

11. A system as in claim 9, wherein the operations further comprise: using the additional column to improve performance of an OLAP query on the table.

12. A system as in claim 7, wherein the operations further comprise:
    computing a jitter value for one or more rows of the set of rows to represent a deviation from the linear formula;
    storing the jitter value for the one or more rows in a jitter column such that the time stamp values of the set of rows are represented by the single slope and the offset with the time stamp values for the one or more rows further including addition of the jitter value.

13. A computer-implemented method comprising:
    physically sorting rows in a database table to group a set of the rows having time stamp values in a time stamp column that are encodable by a linear formula and to organize the rows so that the time stamp values of the rows in the group are ordered and characterizable by an increment and an offset;
    computing the increment and the offset for the set of rows;
    storing the increment and the offset for the set of rows respectively in an increment column and an offset column such that the time stamp values of the set of rows are represented by a single slope and the offset;
    changing values of the time stamps for the set of rows in an original time stamp column to null after storing the increment and the offset for the set of rows;
    applying a run-length compression to the increment column and the offset column for the table; and
    performing query processing on the database table, the query processing comprising use of the increment column and the offset column with the run-length compression applied.

14. A computer-implemented method as in claim 13, further comprising: applying a linear run-length compression to an element number column, the element number column storing element number values that, when multiplied by the increment and added to the offset in the linear formula, compute a corresponding time stamp value.

15. A computer-implemented method as in claim 13, further comprising: populating an additional column with rounded time stamps in which, for each row of the set of rows, the rounded time stamp is equal to the time stamp for that row rounded according to a rounding parameter.

16. A computer-implemented method as in claim 15, further comprising: using the additional column to improve performance of a time stamp range predicate operation on the table.

17. A computer-implemented method as in claim 15, further comprising: using the additional column to improve performance of an OLAP query on the table.

* * * * *